United States Patent
Jang et al.

(10) Patent No.: US 12,512,105 B2
(45) Date of Patent: Dec. 30, 2025

(54) METHOD FOR ENCODING AND DECODING AUDIO SIGNAL USING NORMALIZING FLOW, AND TRAINING METHOD THEREOF

(71) Applicant: ELECTRONICS AND TELECOMMUNICATIONS RESEARCH INSTITUTE, Daejeon (KR)

(72) Inventors: In Seon Jang, Daejeon (KR); Seung Kwon Beack, Daejeon (KR); Jong Mo Sung, Daejeon (KR); Tae Jin Lee, Daejeon (KR); Woo Taek Lim, Daejeon (KR); Byeong Ho Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 382 days.

(21) Appl. No.: 18/150,126

(22) Filed: Jan. 4, 2023

(65) Prior Publication Data

US 2023/0298603 A1    Sep. 21, 2023

(30) Foreign Application Priority Data

Mar. 15, 2022   (KR) .......................... 10-2022-0032180

(51) Int. Cl.
*G10L 19/032*  (2013.01)
*G06N 7/01*  (2023.01)
(Continued)

(52) U.S. Cl.
CPC .............. *G10L 19/032* (2013.01); *G06N 7/01* (2023.01); *G10L 19/04* (2013.01); *G10L 25/30* (2013.01)

(58) Field of Classification Search
CPC ....... G10L 19/032; G10L 19/04; G10L 25/30; G06N 7/01
See application file for complete search history.

(56) References Cited

U.S. PATENT DOCUMENTS

2016/0360237 A1* 12/2016 Said .................... H04N 19/192
2020/0311548 A1   10/2020 Shrivastava
(Continued)

FOREIGN PATENT DOCUMENTS

KR         10-2245682 B1     4/2021
KR    10-2021-0070944 A     6/2021
(Continued)

OTHER PUBLICATIONS

Aditya Arie Nugraha et al., "A Flow-Based Deep Latent Variable Model for Speech Spectrogram Modeling and Enhancement," IEEE/ACM Transactions on Audio, Speech, and Language Processing, 2020, vol. 28.

*Primary Examiner* — Andrew C Flanders
*Assistant Examiner* — Edward Tracy, Jr.

(57) ABSTRACT

A method for encoding an input signal using N flow blocks (N is a natural number greater than or equal to 2) and (N−1) split block(s), which is performed by a processor, may comprise: transmitting, by a k-th flow block (k is a natural number greater than or equal to 1 and less than or equal to N−1) among the N flow blocks, a k-th transformation signal obtained by transforming a received signal into a latent representation to a k-th split block among the (N−1) split block(s); splitting, by the k-th split block, the k-th transformation signal by a predetermined ratio, into a first split signal and a second split signal; transmitting, by the k-th split block, the first split signal to a (k+1)-th flow block; and quantizing a signal transformed by an N-th flow block and the second split signals using a quantization block.

6 Claims, 4 Drawing Sheets

(51) Int. Cl.
    *G10L 19/04*     (2013.01)
    *G10L 25/30*     (2013.01)

(56)         References Cited

U.S. PATENT DOCUMENTS

| | | |
|---|---|---|
| 2021/0142524 A1 | 5/2021 | Djelouah |
| 2021/0271980 A1 | 9/2021 | Polykovskiy |
| 2021/0279912 A1 | 9/2021 | Lee |
| 2022/0005487 A1 | 1/2022 | Sung |
| 2022/0093106 A1* | 3/2022 | Mosayyebpour Kaskari ............. G06N 3/044 |
| 2022/0262378 A1* | 8/2022 | Lim ........................ G10L 25/12 |
| 2023/0368807 A1* | 11/2023 | Liu ....................... G10L 19/022 |

FOREIGN PATENT DOCUMENTS

| | | |
|---|---|---|
| KR | 10-2334390 B1 | 12/2021 |
| WO | 2014/194105 A1 | 12/2014 |
| WO | 2021/118285 A1 | 6/2021 |
| WO | 2021/256781 A1 | 12/2021 |

\* cited by examiner

METHOD FOR ENCODING AND DECODING AUDIO SIGNAL USING NORMALIZING FLOW, AND TRAINING METHOD THEREOF

CROSS-REFERENCE TO RELATED APPLICATIONS

This application claims priority to Korean Patent Application No. 10-2022-0032180, filed on Mar. 15, 2022 with the Korean Intellectual Property Office (KIPO), the entire contents of which are hereby incorporated by reference.

BACKGROUND

1. Technical Field

Example embodiments of the present disclosure relate in general to a technique for encoding and decoding an audio signal, and more particularly, to a method for encoding and decoding an audio signal using a generator utilizing a normalizing flow, and a training method thereof.

2. Related Art

The content described in this section merely provides background information for the present embodiment and does not constitute the prior art.

Among conventional audio compression techniques, a lossy compression-based method reduces the amount of information required to store an audio signal in a device or transmit the audio signal for communication by removing some signal components from the audio signal. Here, by determining the signal component to be removed based on psychoacoustic knowledge, as little distortion caused by the loss of some signals as possible can be perceived by general listeners.

As a representative example, major audio codecs currently used in various multimedia services such as MP3 or AAC may analyze frequency components constituting signals using a traditional signal conversion technology such as modified discrete cosine transform (MDCT), and may then determine the degree to which each frequency component is actually perceived by humans based on a psychoacoustic model designed through various listening experiments and the degree of distortion when lower bits are assigned to encoding, thereby determining the number of bits to be allocated to each frequency component according to the importance of each frequency component. As a result, current commercial codecs achieve compression restoration quality at a level that is indistinguishable from the original signal by a general listener even at a compression rate of about 7 to 10 times.

In recent years, there have been widespread attempts to leave behind traditional signal processing methods like that described above and graft a rapidly developing deep neural network-based deep learning technology to the compression of audio signals. The simplest way to apply the deep learning technology to the audio codec is to replace the frequency transformation and inverse transformation process with a deep learning network. For example, the use of a simple structure known as an auto-encoder can replace the encoding and decoding process of the audio codec. However, this method does not have high performance, so there is a need to use a generative model-based deep learning network as a more suitable method.

Examples of applying a flow-based deep learning generative model to speech signal processing include WaveGlow that is a neural vocoder technology. WaveGlow may perform modeling on probability distribution using a function that bisects the dimension of data and performs an affine transformation, and may design an affine coupling layer for 1×1 invertible filtered data, thereby effectively performing modeling on the probability distribution of the data by generalizing each component combination of the data. In particular, a voice signal is generated by passing through a deep learning network of a flow-based generative model using a Mel-spectrogram as a condition vector that determines the characteristics of a sample to be generated. Although WaveGlow has efficient results as a neural vocoder that generates a voice waveform with only a Mel-spectrogram, there is a performance limitation in generating the original voice.

SUMMARY

Accordingly, example embodiments of the present disclosure are provided to substantially obviate one or more problems due to limitations and disadvantages of the related art.

Example embodiments of the present disclosure provide a decoding and encoding method and apparatus that have excellent audio quality, in constructing an end-to-end deep neural network structure for encoding and decoding audio signals, after restoration of the audio signals compared to the same data by performing encoding and decoding using a normalizing flow.

Example embodiments of the present disclosure provide a decoding and encoding method that have excellent audio quality after restoration of data compared to the amount of the same data by providing an effective training method of a device that performs encoding and decoding using a normalizing flow.

According to a first exemplary embodiment of the present disclosure, a method for encoding an input signal using N flow blocks (N is a natural number greater than or equal to 2) and (N−1) split block(s), which is performed by a processor, may comprise: transmitting, by a k-th flow block (k is a natural number greater than or equal to 1 and less than or equal to N−1) among the N flow blocks, a k-th transformation signal obtained by transforming a received signal into a latent representation to a k-th split block among the (N−1) split block(s); splitting, by the k-th split block, the k-th transformation signal by a predetermined ratio, into a first split signal and a second split signal; transmitting, by the k-th split block, the first split signal to a (k+1)-th flow block; and quantizing a signal transformed by an N-th flow block and the second split signals using a quantization block.

The flow block may be a generative model trained by applying a normalizing flow-based generative model.

The second split signal may be selectively not transmitted to the outside of the split block according to an environment in which an encoder is used.

The quantization block may apply a different magnitude value of a quantization step to each of the signal transformed by the N-th flow block and the second split signals.

The quantization block may apply a smaller magnitude value of the quantization step along with an increase in k of the split block transmitting the second split signals.

According to a second exemplary embodiment of the present disclosure, a method for decoding a signal using N inverse-flow blocks (N is a natural number greater than or equal to 2) and (N−1) gather block(s), which is performed by a processor, may comprise: transmitting a k-th restoration signal restored by a k-th inverse-flow block (k is a natural number greater than or equal to 1 or less than or equal to N)

among the N inverse-flow blocks, to a (k−1)-th gather block among the (N−1) gather block(s); adding, by the (k−1)-th gather block, a split signal received from an inverse-quantization block and a restoration signal received from the k-th inverse-flow block, and transmitting, by the (k−1)-th gather block, the added signal to a (k−1)-th inverse-flow block; and outputting, by a first inverse-flow block having k of 1, a final restoration signal.

The inverse-flow block may be a generative model trained by applying a normalizing flow-based generative model.

The transmitting, by the (k−1)-th gather block, the signal to the (k−1)-th inverse-flow block may include determining whether the split signal is received from the inverse-quantization block.

The method may further comprise, when it is determined that the split signal is not received, receiving a prediction signal generated through a (k−1)-th prediction block.

The prediction block may estimate a mean and distribution from an inversely transformed signal transmitted from an inverse-flow block connected to the prediction block, generate a prediction signal from a probability distribution having the estimated mean and distribution, and transmit the generated prediction signal to the gather block.

The inverse-quantization block may apply a different magnitude value of a quantization step for each inverse-quantization block.

The inverse-quantization block may apply a smaller magnitude value of the quantization step along with an increase in k of the gather block to which a signal is transmitted by the inverse-quantization block.

According to a third exemplary embodiment of the present disclosure, a training method for encoding and decoding an audio signal, which is performed by a processor, may comprise: (a) generating an encoded signal by encoding an input audio signal using one or more flow blocks and one or more split blocks; (b) transmitting a transformation signal generated by transforming the encoded signal to a decoder by using one or more quantization blocks and one or more corresponding inverse-quantization blocks; (c) decoding the transmitted inversely quantized signal using one or more inverse-flow blocks and one or more gather blocks to output a restoration signal; (d) performing decoding using the one or more inverse-flow blocks, the one or more gather blocks, and one or more prediction blocks to output a predicted restoration signal; and minimizing a loss function value calculated based on the input audio signal, the restoration signal, and the predicted restoration signal obtained by repeatedly performing (a) to (d) by training the flow block, the inverse-flow block, and the prediction block.

The loss function may be calculated through a negative log likelihood based on a transformation signal extracted and split in an intermediate stage of the normalizing flow, and the sum of weights of errors between the original audio signal, the restoration signal, and the predicted restoration signal.

The encoding in a process of generating the restoration signal may be performed including N flow blocks (N is a natural number greater than or equal to 2) and (N−1) split block(s), and further include: transmitting, by a k-th flow block (k is a natural number greater than or equal to 1 and less than or equal to N−1) among the N flow blocks, a k-th transformation signal obtained by transforming a received signal into a latent representation to a k-th split block among the (N−1) split block(s); splitting, by the k-th split block, the k-th transformation signal by a predetermined ratio, into a first split signal and a second split signal; and transmitting, by the k-th split block, the first split signal to a (k+1)-th flow block, and transmitting the second split signals to a corresponding quantization block.

The encoding in the process of generating the restoration signal may further include: (a) encoding, by a preceding inverse-flow block, a transmitted signal; (b) receiving, by the gather block, a restoration signal of the preceding inverse-flow block and a split signal transmitted from the inverse-quantization block to transmit the received signals to a subsequent inverse-flow block; and outputting the restoration signal by repeatedly performing (a) and (b).

The decoding in a process of generating the predicted restoration signal may further include: (a) decoding, by an inverse-flow block, a received signal to transmit the decoded signal to a gather block and a prediction block; (b) generating, by the prediction block, a prediction signal based on the transmitted decoded signal to transmit the generated prediction signal to the gather block; (c) transmitting, by the gather block, the signal transmitted from the inverse-flow block and the prediction signal to a subsequent inverse-flow block; (d) transmitting, by the gather block, a decoded signal of a preceding inverse-flow block and a prediction signal of a preceding prediction block to the subsequent inverse-flow block; and outputting a predicted restoration signal by repeatedly performing (a) to (d).

The minimizing of the loss function value may further include updating weights of a generative model of the flow block, the inverse-flow block, and the prediction block through back propagation.

An invertible transformation function may be applied to the flow block and the inverse-flow block, and the flow block and the corresponding inverse-flow block may have an inverse transformation structure.

According to the present disclosure, audio encoding and decoding having a high compression rate and excellent quality can be performed using a normalizing flow-based generative model.

In addition, input audio signals may be compressed and transmitted as a plurality of flow-based transformation signals by using a normalizing flow generative model in an encoding process, and based on this, the original audio signals may be restored using an inverse structure of a normalizing flow-based generative model in a decoding process to predict and generate transformation signals, thereby restoring the audio signals even with data transmission at a low bit rate.

In addition, according to the present disclosure, when quantizing transformation signals, it is possible to increase audio coding efficiency by controlling the amount of information of each of the transformation signals.

DETAILED DESCRIPTION OF THE EMBODIMENTS

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A technique for modeling a probability distribution for given data is called a generative model. Representative generative models include a variational auto-encoder (VAE), a generative adversarial network (GAN), and a normalizing flow. Since the VAE and GAN indirectly model the probability distribution of data, optimization is difficult and training is unstable. On the other hand, the normalizing flow-based generative model directly models the probability distribution for given data so that, compared to other generative model techniques, training instability is less, inference about latent variables is possible, and faster generation of a new sample is possible.

The normalizing flow-based generative model can model a random variable for given data x through a change of variables by applying a variable transformation function $f_i(\cdot)$ to a latent variable z. Here, a transformation process of the latent variable as in Equation 1 is called a flow, and a variable transformation process for modeling the data x is called a normalizing flow.

$$z_i = f_i(z_i - 1) \quad \text{[Equation 1]}$$

An objective function of a normalizing flow-based deep learning generative model can be obtained as a negative log-likelihood for training data, and the log-likelihood for training data can be calculated by designing a variable transformation function in an easy-to-obtain form for the reversible transformation function and the Jacobian determinant. The probability distribution of the data x can be directly modeled by performing training to minimize the objective function value of the flow-based deep learning generative model. For reference, as an approach to designing the variable transformation function in an easy-to-obtain form for the Jacobian determinant in the flow-based deep learning generative model, there are a bipartite flow method that models the variable transformation function $f_i$ as an affine transformation function by bisecting the data x and an autoregressive flow method that models the variable transformation function $f_i$ as an autoregressive model.

Figure 1:
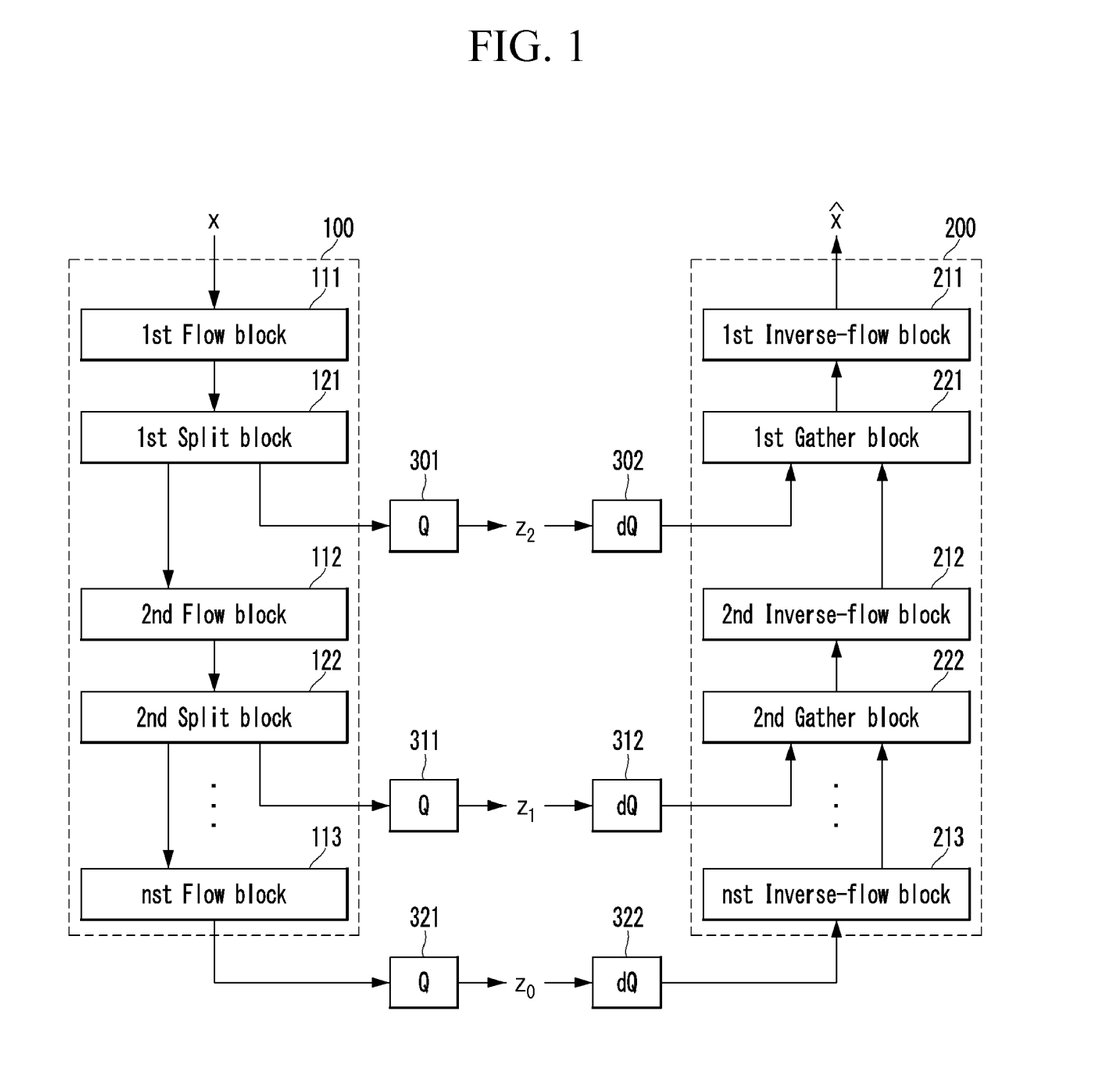
FIG. 1 is a functional block diagram illustrating an apparatus for encoding and decoding an audio signal using a normalizing flow according to an embodiment of the present disclosure.

FIG. 1 is a functional block diagram illustrating an apparatus for encoding and decoding an audio signal using a normalizing flow according to an embodiment of the present disclosure.

Referring to FIG. 1, an apparatus for encoding and decoding an audio signal using a normalizing flow includes an encoder 100 including flow blocks 111, 112, and 113 and split blocks 121 and 122, a decoder 200 including inverse-flow blocks 211, 212, and 213 and gather blocks 221 and 222, and a quantizer including quantization blocks 301, 311, and 321 and inverse-quantization blocks 302, 312, and 322.

The encoder 100 may be a device that performs encoding. In other words, the encoder 100 may be an encoding device that transforms an input audio signal into a latent representation using a normalizing flow. The encoder 100 may include at least one flow block 111, 112, and 113 and at least one split block 121 and 122.

The at least one flow block 111, 112, and 113 may transform an input signal into a latent representation. The at least one split block 121 and 122 may split the input signal at a predetermined ratio. A portion of the split signal may be transmitted to the flow blocks 112 and 113 connected to the split blocks 121 and 122, and the split residual signals may be transmitted to the quantizer.

The quantizer may further include the quantization blocks 301, 311, and 321 and the inverse-quantization block. The quantization blocks 301, 311, and 321 may compress the latent representations transformed by the encoder 100, and the inverse-quantization blocks 302, 312, and 322 may be blocks that inversely quantize the compressed latent representations and transmit the inversely quantized latent representations to the decoder 200.

The decoder 200 may be a device that performs decoding. In other words, the decoder 200 may be a decoding device that receives the inversely quantized signal and restores the original signal. The decoder 200 may further include at least one inverse-flow block 211, 212, and 213 and at least one gather block 221 and 222.

The at least one inverse-flow block 211, 212, and 213 may perform inverse-flow transformation on the signals received from the quantizer to restore the resultant signal. The at least one gather block may combine the signal restored by the preceding inverse-flow blocks 212 and 213 and the signal transmitted from the corresponding split block, and may transmit the combined signal to the subsequent inverse-flow blocks 211 and 212.

Here, the inverse-flow blocks 211, 212, and 213 have an inverse structure of the flow blocks 111, 112, and 113. In other words, the transformation function of the inverse-flow blocks 211, 212, and 213 may have an inverse function relation of the transformation function of the flow blocks 111, 112, and 113.

Referring again to FIG. 1, an input audio signal x may be transformed into a first transformation signal by the first flow block 111. The first transformation signal is split at a predetermined ratio by the first split block 121, one signal of the split signals may be transmitted to the second flow block 112, and the residual signals $z_2$ may be transmitted to the corresponding first gather block 221 through the quantizers 301 and 302.

In addition, the signal transmitted to the second flow block 112 may be transformed into a second transformation signal by the second flow block 112, and the second transformation signal may be split at a predetermined ratio by the second split block 122. One signal of the split signals may be transmitted to the third flow block 113, and the residual signals $z_1$ may be transmitted to the second gather block 222 through the quantizers 311 and 312.

The signal transmitted to the third flow block 113 may be transformed into a final transformation signal $z_0$ by the third flow block 113, and may be transmitted to the corresponding third inverse-flow block 213 through the quantizers 321 and 322.

The third inverse-flow block 213 may restore the transmitted signal $z_0$ and may transmit the restored signal to the second gather block 222. The second gather block 222 may transmit the signal transmitted from the third inverse-flow block 213 and the signal $z_1$ transmitted from the second split block 122 to the second inverse-flow block 212. The second inverse-flow block 212 may restore the received signal to transmit the restored signal to the first gather block 221, and the first gather block 221 may transmit the restored signal transmitted from the second inverse-flow block 212 and the signal $z_2$ transmitted from the first split block 121 to the first inverse-flow block 211. The first inverse-flow block 211 may restore the signal transmitted from the first gather block 221 to output a final restoration signal $\hat{x}$.

As described above, transformation signals $z_0$, $z_1$, $z_2$ split and extracted during a normalizing flow process may have a latent signal modeling effect of transforming the input audio signal x into a multi-scale structure in each flow block.

In addition, since the entropy of the transformation signal for each normalizing flow stage is different, quantization may be performed by differently applying the quantization step magnitude of the quantization step of the transformation signals $z_1$, $z_2$ extracted in the intermediate stage of the normalizing flow and the final transformation signal $z_0$ of the normalizing flow. In particular, by increasing the quantization step magnitude of the transformation signal in the order extracted by the encoder, it is possible to lower the bit rate while maintaining the coding quality. In other words, the magnitude of the quantization step of the signal $z_1$ split from the second split block may be smaller than the magnitude of the quantization step of the signal $z_2$ split from the first split block. In addition, the magnitude of the quantization step of the signal $z_1$ split from the second split block may be larger than the magnitude of the quantization step of the final transformation signal $z_0$.

Figure 2:
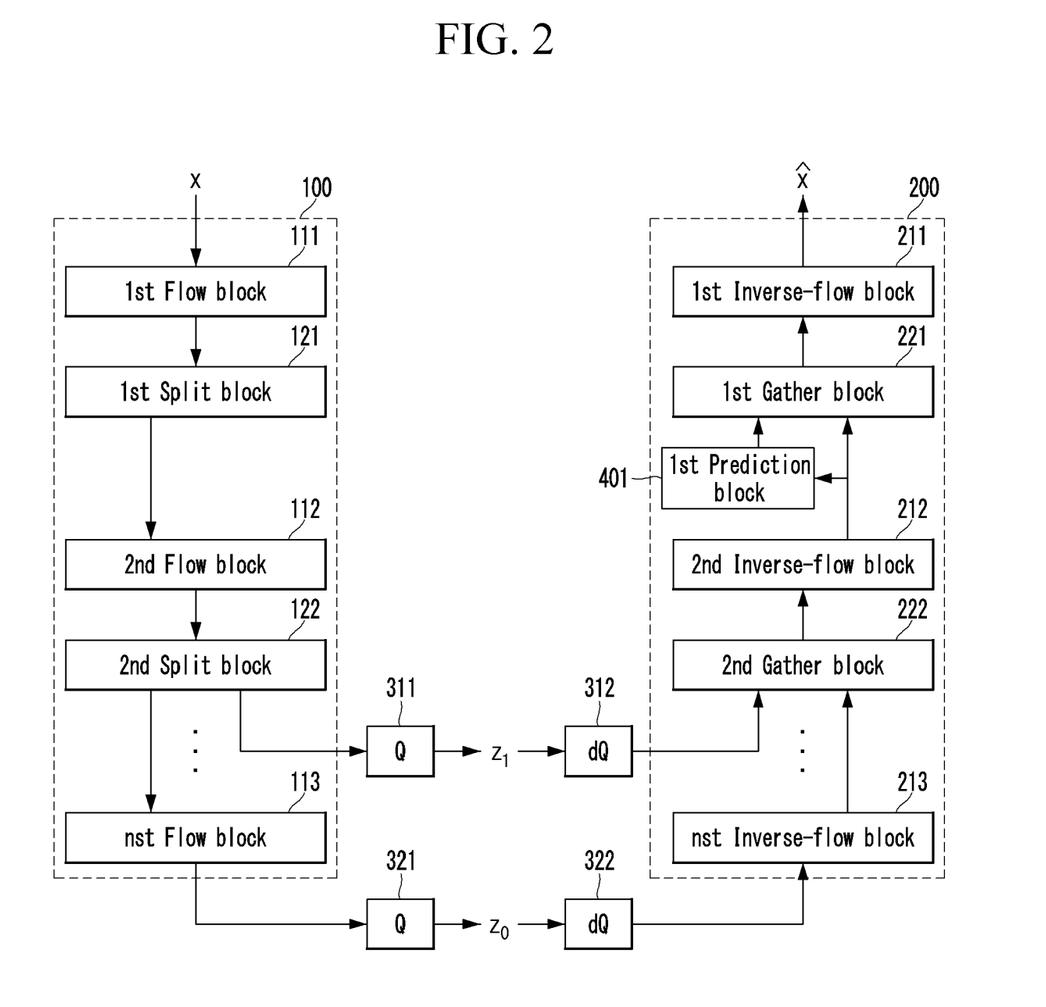
FIG. 2 is a functional block diagram illustrating an apparatus for encoding and decoding an audio signal using a normalizing flow according to another embodiment of the present disclosure.

FIG. 2 is a functional block diagram illustrating an apparatus for encoding and decoding an audio signal using a normalizing flow according to another embodiment of the present disclosure.

When the encoder does not intentionally output a transformation signal in the intermediate stage in order to propose a bit rate in consideration of the transmission environment, or when the transmitted transformation signal in the intermediate stage does not exist in the transmission situation, the decoder 200 may further include a prediction block 401.

The prediction blocks 401 and 402 may receive a signal inversely transformed by the preceding inverse-flow blocks 212 and 213 to estimate the mean and variance, which are parameters of an assumed probability distribution, may predict a transformation signal from the inversely transformed signal by performing sampling from the estimated probability distribution, and may transmit the predicted signal to the subsequent gather blocks 221 and 222.

Referring to FIG. 2, when there is no intermediate transformation signal $z_2$ transmitted from the encoder 100 to the first gather block 221, the first gather block 221 may receive a signal restored in the second inverse-flow block 212 and a prediction signal that is a transformation signal predicted by receiving the signal restored in the second inverse-flow block 212, and may transmit the received signals to the first inverse-flow block. The case where there is no intermediate transformation signal $z_2$ transmitted from the encoder 100 to the first gather block 221 has been described as an example, but the present disclosure is not limited thereto. Even when there is no signal $z_1$ transmitted from the encoder to the second gather block 222, decoding may be performed using the prediction block as well.

Depending on an environment in which an apparatus for encoding and decoding an audio signal using a normalizing flow according to the present disclosure is used, when there is no restriction on a bit rate, an input audio signal may be encoded and decoded by using intermediate transfer signals $z_1$, $z_2$ and a final transformation signal $z_0$, and the bit rate may be minimized by using the final transformation signal $z_0$ and a prediction block.

Figure 3:
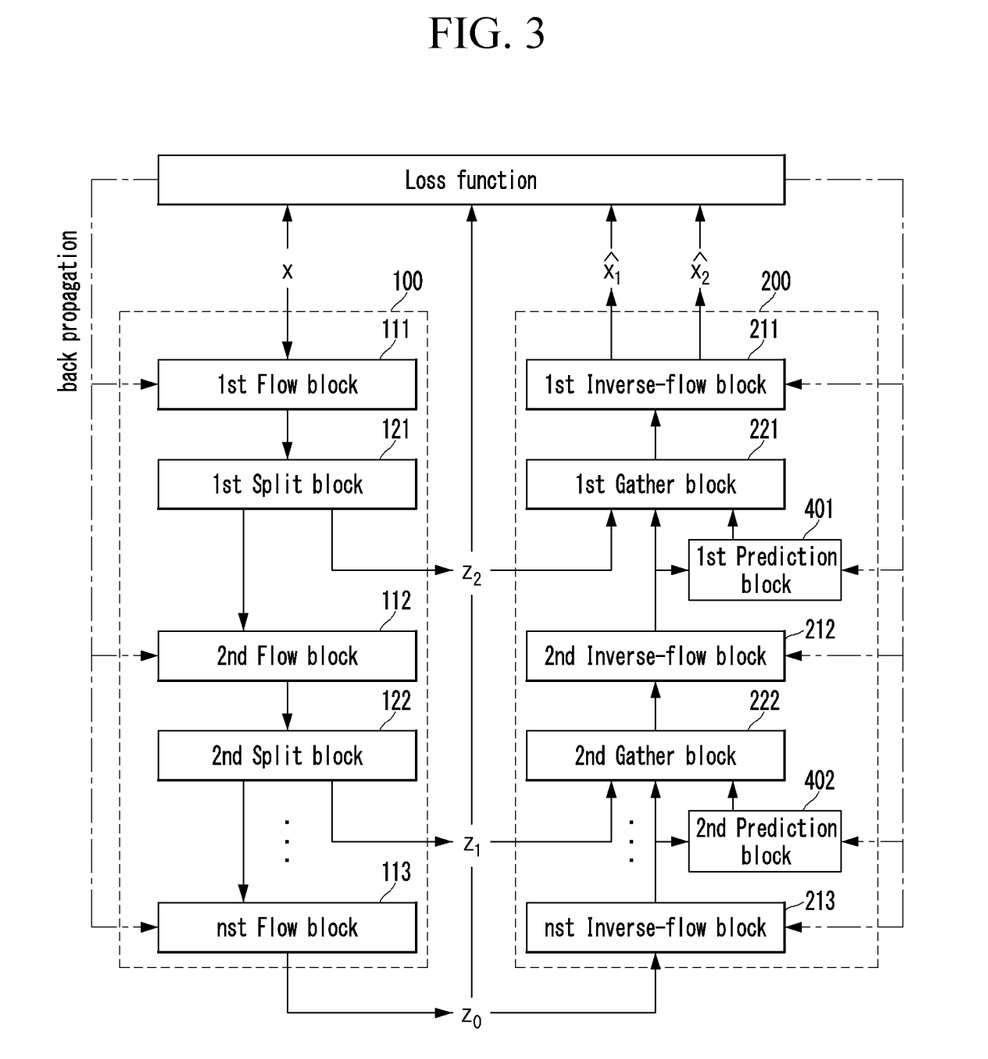
FIG. 3 is a functional block diagram illustrating a training process of an apparatus for encoding and decoding an audio signal using a normalizing flow according to an embodiment of the present disclosure.

FIG. 3 is a functional block diagram illustrating a training process of an apparatus for encoding and decoding an audio signal using a normalizing flow according to an embodiment of the present disclosure.

Referring to FIG. 3, the training process of the apparatus for encoding and decoding an audio signal using a normalizing flow may receive only a signal $\hat{X}_1$ restored by the decoder 200 through intermediate transfer signals $z_1$, $z_2$ split through a split block and a final transformation signal $z_0$ and the final transformation signal $z_0$ output from the encoder, may calculate a loss function by using a restoration signal $\hat{X}_2$ output using prediction blocks 401 and 402 without the intermediate transfer signals $z_1$, $z_2$ and the original audio signal x input to the encoder, and may minimize the calculated loss function so that flow blocks, inverse-flow blocks, and prediction blocks may be trained. Here, the weight of a flow-based generative model may be updated through back propagation to minimize the loss function value, and training of the generative model may be performed.

The loss function may be calculated through a negative log likelihood, which is a loss function of a normalizing flow-based generative model, and the sum of weights of errors between an original signal and a restoration signal. The loss function of the normalizing flow-based generative model may calculate the negative log-likelihood as in Equation 2 based on the transformation signal extracted and split in the intermediate stage of the normalizing flow, and may calculate the errors between the original signal and the restoration signal as a mean squared error (MSE) as in Equation 3.

$$\text{Loss}_{NF} = -\frac{1}{N} \sum \log p_\theta(z_0) + \log p_\theta(z_1 \mid z_0) + \log p_\theta(z_2 \mid z_1) \quad \text{[Equation 2]}$$

$$\text{Loss}_{MSE} = -\frac{1}{N} \sum E\left[(X - \hat{X}_1)^2\right] + E\left[(X - \hat{X}_2)^2\right] \quad \text{[Equation 3]}$$

In the training method of the apparatus for encoding and decoding an audio signal using the normalizing flow, since a probability distribution of a latent variable signal is assumed in advance and the assumed probability distribution is reflected in the training process, the latent variable signal having a data distribution more suitable for audio encoding may be generated to increase the compression efficiency.

In addition, the compression efficiency may be increased by applying a different quantization method of the transformation signals extracted in the intermediate stage of the normalizing flow and the final transformation signal of the normalizing flow. This is based on the fact that the entropy of the transformation signal is different for each normalizing flow stage, and in one embodiment, by reducing the magnitude of the quantization step of the transformation signal in the order extracted by the encoder, it is possible to lower the bit rate while maintaining the coding quality.

Figure 4:
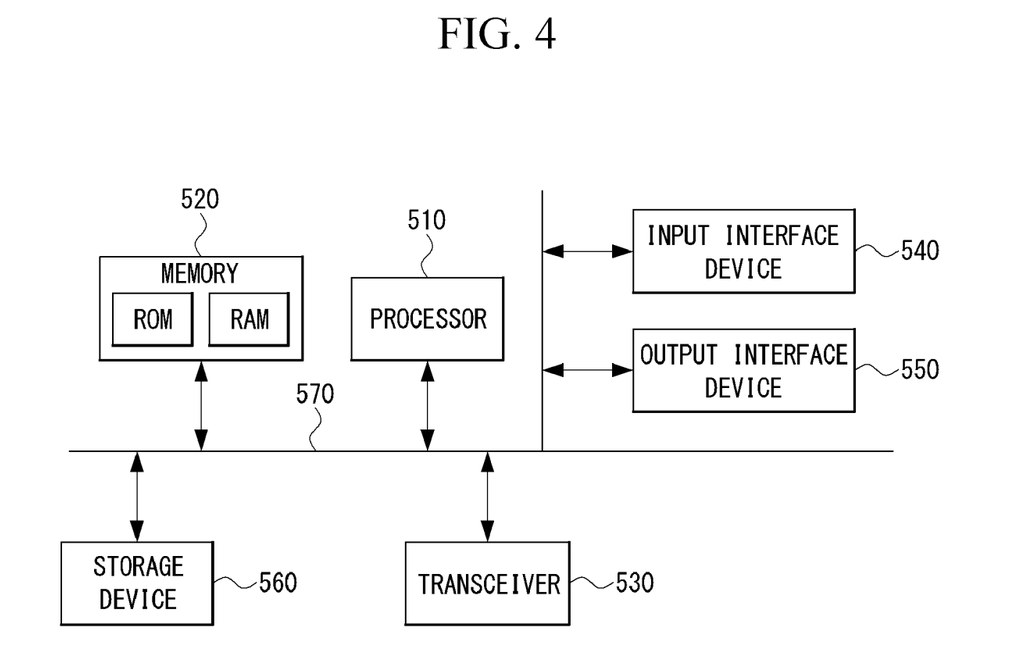
FIG. 4 is a physical block diagram illustrating an apparatus for encoding and decoding an audio signal using a normalizing flow according to an embodiment of the present disclosure.

FIG. 4 is a physical block diagram illustrating an apparatus for encoding and decoding an audio signal using a normalizing flow according to an embodiment of the present disclosure.

Referring to FIG. 4, the apparatus for encoding and decoding an audio signal using a normalizing flow according to an embodiment of the present disclosure may include a processor and a memory configured to store at least one instruction executed through the processor, and the at least one instruction may be configured to cause the processor to encode the input audio signal by using one or more flow blocks and one or more split blocks, to transmit the encoded signal to a decoder by using one or more quantization blocks and one or more corresponding inverse-quantization blocks, and to decode the transmitted encoded signal using one or more inverse-flow blocks and one or more gather blocks to output a restoration signal.

A processor 510 may be a central processing unit (CPU), a graphics processing unit (GPU), or a dedicated processor on which methods according to embodiments of the present disclosure are performed.

Each of a memory 520 and a storage device 560 may be configured as at least one of a volatile storage medium and a non-volatile storage medium. For example, the memory 520 may be configured as at least one of a read only memory (ROM) and a random access memory (RAM).

In addition, the apparatus for encoding and decoding an audio signal using the normalizing flow may include a transceiver 530 configured to perform communication through a wireless network.

In addition, the apparatus for encoding and decoding an audio signal using the normalizing flow may further include an input interface device 540 configured to receive the audio signal, an output interface device 550 configured to output the restoration signal, and the storage device 560 configured to store training data.

Respective components included in the apparatus for encoding and decoding an audio signal using the normalizing flow may be connected to each other by a bus 570 to perform communication with each other.

Examples of the apparatus for encoding and decoding an audio signal using the normalizing flow of the present disclosure may include a communicable desktop computer, a laptop computer, a notebook, a smartphone, a tablet PC, a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, a digital video recorder, a digital video player, a personal digital assistant (PDA), and the like.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A computer-implemented training method for encoding and decoding an audio signal, which is performed by a processor, the training method comprising:
   (a) performing encoding, by one or more flow blocks and one or more split blocks, on an input audio signal to generate an encoded signal, each of the one or more flow block being a generative model trained by applying a normalizing flow-based generative model;
   (b) transforming, by using one or more quantization blocks and one or more corresponding inverse-quantization blocks, the encoded signal to generate a transformation signal and transmitting the transformation signal to a decoder;
   (c) performing first decoding, by using one or more inverse-flow blocks and one or more gather blocks, on the transmitted inversely quantized signal to output a restoration signal, each of the one or more inverse-flow block being a generative model trained by applying a normalizing flow-based generative model;
   (d) performing second decoding, by using the one or more inverse-flow blocks, the one or more gather blocks, and one or more prediction blocks to output a predicted restoration signal; and
   training the flow block, the inverse-flow block, and the prediction block so as to
   minimize a loss function value calculated based on the input audio signal, the restoration signal, and the predicted restoration signal obtained by repeatedly performing (a) to (d),
   wherein the encoding is performed including N flow blocks (N is a natural number greater than or equal to 2) and (N−1) split block(s), and further includes:
   transmitting, by a k-th flow block (k is a natural number greater than or equal to 1 and less than or equal to N−1) among the N flow blocks, a k-th transformation signal obtained by transforming a received signal into a latent representation to a k-th split block among the (N−1) split block(s);
   splitting, by the k-th split block, the k-th transformation signal by a predetermined ratio, into a first split signal and a second split signal; and
   transmitting, by the k-th split block, the first split signal to a (k+1)-th flow block, and transmitting the second split signals to a corresponding quantization block.

2. The computer-implemented training method of claim 1, wherein the loss function is calculated through a negative log likelihood based on a transformation signal extracted and split in an intermediate stage of the normalizing flow, and the sum of weights of errors between the original audio signal, the restoration signal, and the predicted restoration signal.

3. The computer-implemented training method of claim 1, wherein the encoding in the process of generating the restoration signal further includes
   (a) encoding, by a preceding inverse-flow block, a transmitted signal;
   (b) receiving, by the gather block, a restoration signal of the preceding inverse-flow block and a split signal transmitted from the inverse-quantization block to transmit the received signals to a subsequent inverse-flow block; and
   outputting the restoration signal by repeatedly performing (a) and (b).

4. The computer-implemented training method of claim 1, wherein the decoding in a process of generating the predicted restoration signal further includes
   (a) decoding, by an inverse-flow block, a received signal to transmit the decoded signal to a gather block and a prediction block;
   (b) generating, by the prediction block, a prediction signal based on the transmitted decoded signal to transmit the generated prediction signal to the gather block;
   (c) transmitting, by the gather block, the signal transmitted from the inverse-flow block and the prediction signal to a subsequent inverse-flow block;
   (d) transmitting, by the gather block, a decoded signal of a preceding inverse-flow block and a prediction signal of a preceding prediction block to the subsequent inverse-flow block; and
   outputting a predicted restoration signal by repeatedly performing (a) to (d).

5. The computer-implemented training method of claim 1, wherein the minimizing of the loss function value further includes updating weights of a generative model of the flow block, the inverse-flow block, and the prediction block through back propagation.

6. The computer-implemented training method of claim 1, wherein an invertible transformation function is applied to the flow block and the inverse-flow block, and the flow block and the corresponding inverse-flow block have an inverse transformation structure.

* * * * *